United States Patent Office 3,741,919
Patented June 26, 1973

3,741,919
URETHANE COMPOSITION PREPARED FROM POLYISOCYANATES AND PHOSPHONATED POLYOXYALKYLENE ESTERS
Morton Lewis, Elmhurst, Ill., assignor to Swift & Company, Chicago, Ill.
No Drawing. Original application July 30, 1969, Ser. No. 846,247, now Patent No. 3,682,988. Divided and this application Sept. 27, 1971, Ser. No. 184,262
Int. Cl. C08g 22/14, 22/44
U.S. Cl. 260—2.5 AR  18 Claims

ABSTRACT OF THE DISCLOSURE

Phosphonated polyoxyalkylene ethers are produced by reacting a halogen-containing polyoxyalkylene ether with an aliphatic or aromatic phosphite. The resulting compositions are used to prepare flame resistant, non-rigid polyurethane foams.

---

This application is a division of copending application Ser. No. 846,247, filed July 30, 1969 now U.S. Pat. No. 3,682,988.

This invention pertains generally to the preparation of novel polyether compounds containing phosphonate groups and may or may not contain halogen. The phosphonated polyoxyalkylene ethers are useful as lubricating oil aditives and as a polyol reactant in the preparation of flame-resistant polyurethane foams.

It has previously been proposed to prepare polyurethane foams by reacting polyhydroxy compounds such as a hydroxy containing polyester, a polyoxyalkylene glycol or similar polyols with an organic polyisocyanate in a reaction mass containing a foaming agent. Polyurethane foams produced in this conventional manner have some degree of flame resistance but it has been necessary in the past to produce a foam that possesses a much higher degree of flame resistance for use in a number of systems. For example, U.S. Pat. No. 2,577,281 teaches the use of an unsaturated alkyl ester of an aryl phosphonic acid in a foamable mixture to produce a foam that has fire resistant properties. Halogen-containing esters of phosphonic acid and phosphorus acid, ammonium chloride, ammonium phosphate, chlorinated paraffins, chlorinated polyphenyl, chlorendic acid, and chlorendic anhydride have been used as additives in foamable reaction mixtures to impart flame-resistant properties to foam. Additives of these types are not chemically bonded in the urethane polymer and are slowly lost on aging of the foam by volatillization, leaching and migration. In addition, the use of flame-proofing additives may upset the surface chemistry of the foaming system and lead to severe destruction of internal cell structures, formation of a coarse cell structure and/or collapse of the foam during manufacturing. The difficulty in successful flame-proofing urethane foams, as opposed to bulk materials, is further complicated by the troublesome problems of proper additive distribution at gas-solid interfacial surfaces due to the inherent physical movement of the composition during the foaming operation.

Foams made flame-resistant merely by the physical addition of additives often deteriorate on aging because the aditives act as plasticizers. Deteriorization of this type also adversely affects the physical properties of the foam. For example, a halogen-containing material incorporated into a urethane foam may reduce flammability tendencies but at the same time act as a migrating plasticizer during the curing or foaming operation or in use and effect a loss of tensile strength, compression set or load-bearing properties.

Polyurethane foams may be classified as rigid, semi-rigid, flexible, etc., and the art of making each particular type has been developed to a high degree. For example, in the making of polyurethane foams, various components such as surfactants, blowing agents, particular isocyanates, particular polyols, etc., have been experimented with to obtain foams having special characteristics. In the formulation of these polyurethane foams, special consideration must be given to the effect of each of the various components on the physical properties as well as the flammability characteristics.

At the present time, there are many different compounds being used to impart flame retardancy in urethanes, however, only a select few are effective when used in non-rigid urethane systems. Various percentages of chlorine, bromine, antimony and phosphorous are integral parts of these compounds, and it is these elements which make the component an effective flame retardant. Some compounds contain only one of these elements while others contain two or three. These compounds fall generally into one of two basic classes when used in a urethane system since they are either reactive or non-reactive in reference to the isocyanate component of the system.

In addition to its normal level of flame-retardant elements a reactive flame retardant in a urethane reaction can be described chemically as a compound containing one or more labile hydrogen atoms available as reactive sites. The labile hydrogen can be part of any group such as amino, hydroxyl, carboxyl, etc., but it has to be reactive enough to react with the isocyano group of the isocyanate.

The reactive type of flame-retardant additive can combine chemically with the foam and will not evaporate from the surface or leach out when the foam is completely cured. However, not all reactive compounds can be used to produce a suitable non-rigid foam. Further, some compounds have too high a cross-linking density, and their use is limited to the rigid urethane foam systems.

A second type of flame retardant which can be used in non-rigid polyurethane systems is a compound still containing flame retardant elements but having no hydrogens available for reaction with isocyanate groups.

Some non-reactive compounds are effective flame retardants, however, their effectiveness is reduced considerably over time. This is so because they tend to evaporate and leach out due to the high surface area to weight ratio of the flexible foams. This type of product simply adds dead weight to the foam, thus increasing the density which is an economic disadvantage since additional cost is incurred with no additional volume of foam produced.

Incorporation of flame retardant materials in the urethane foams by chemically bonding the additives into the polymer network offers advantages over foams containing non-reactive, additive flame retardants. In this connection, it has been proposed in U.S. Pat. No. 3,206,416 to use halogenated castor oil, namely brominated or chlorinated castor oil, as a reactive flame retardant in polyurethane foams. These halogenated castor oils produce flame-resistant polyurethane foams but possess the disadvantage of themselves being chemically unstable at ambient temperatures or temperatures in the range of from 15° C. to 40° C.

Use of these halogenated oils in polyurethane foam preparations is then limited since the physical properties of the compound that are important for imparting the desired properties into the foam, especially viscosity, hydroxyl number, acid number and color, change substantially on aging at ambient temperatures. For example, brominated castor oil prepared in the aforementioned patent undergoes a decrease of hydroxyl number and a parallel increase in acid number during aging. The use of halogenated castor oils as reactive flame-retardant polyols in polyurethane foams suffers from the disadvantage of having physical properties constantly changing on aging. A mixture that is formulated using these halogenated oils as the polyol constituent may not be foamable since the large concentration of acid may effectively neutralize the small amount of amine and organo-metallic catalysts that are often added to catalyze the urethane reactions.

While most of the reactive flame retardants on the market today are designed for the rigid systems, manufacturers are constantly seeking new constituents for the flexible urethane foam market. However, several difficulties are apparent when trying to apply rigid foam flame retardants to flexibles. If a flame retardant could be designed much like one of the main components of the foam, then it could be substituted into the foamable composition to give a minimum of adverse effects.

It is one object of this invention to prepare new compositions of matter containing phosphonate groups.

It is another object of this invention to provide a method for making flame resistant polyurethane foams which will remain so even after prolonged aging period.

Another object of this invention is the production of phosphonated polyoxyalkylene ethers that possess stability and physical properties that remain essentially unchanged upon aging.

Additional objects, if not specifically set forth herein, will be readily apparent to those skilled in the art from a reading of the detailed description of the invention which follows.

Generally, the compositions of this invention comprise phosphonated polyoxyalkylene ethers and may or may not contain halogen depending upon the amounts of reactants involved. The products are formed by reacting a trialiphatic or triaromatic phosphite or a mixed trialiphatic, aromatic phosphite with a halogen-containing polyoxyalkylene ether. In carrying out the process, it is possible to remove all of the halogen present on the polyoxyalkylene ether by adding an equivalent amount of phosphite for all the halide and thus synthesize a completely phosphonated polyether. In those instances where halogen is desirable, i.e., flameproofing compositions, the totally phosphonated products lie outside the scope of this class of compounds. However, the totally phosphonated polyethers are clearly novel compositions of matter and function as additives for lubricating oils. The fully phosphonated polyethers improve the wear and extreme pressure properties of petroleum and synthetic diester lubricants.

The halogen-containing polyethers used to react with the phosphite will generally possess about 10% to 60%, by weight of the molecule, of a halogen, usually chlorine, bromine or iodine. Due to the method by which the halogen-containing polyether is formed (reaction of a polyhydric alcohol and a haloepoxide) each alkyleneoxy group of the polymeric polyoxyalkylene polyether will contain a halogen atom. Usually this is the only halogen present on the polyether reactant, however, in one particular embodiment of the invention, the polyhydric component which is reacted with the haloepoxide, is unsaturated and can be further halogenated either prior to, subsequent to or simultaneously with the phosphonation step.

During the phosphonation step about 0.1% to 100% of the replaceable halogen is replaced by a phosphonate group with the liberation of an organic halide; an alkyl halide if a trialkyl phosphite was used. When forming a polyol for flexible urethane foams enough phosphite is used so that the final product will contain about 1% to about 5%, by weight, of phosphorus.

In preparing the novel compositions of this invention, a trialiphatic or triaromatic phosphite is reacted with the halogen-containing polyoxyalkylene ether (one mole of phosphite per each halogen equivalent to be removed) at temperatures below about 150° C. The polyoxyalkylene reactant possesses terminal hydroxyl functions and in order to preserve the integrity of these hydroxyl functions the temperature of the reaction mass should not be allowed to rise about about 150° C.

It is important that the temperature be mild since temperatures held too high result in drastically decreased hydroxyl values. Since any utility in urethane foam systems is dependent upon hydroxyl value, the reaction temperature must be closely controlled during phosphonation. If the temperature does get to 150° C. or higher there is an appreciable loss of hydroxyl value, and the longer it is held at this high range the lower is the resulting hydroxyl value of the product. The hydroxyl value of a polyol useful for non-rigid urethane foams must be in the 25 to 300 range, 30 to 100 for flexibles, and more specifically around 50 to 60. Any drastic decrease in hydroxyl value for the polyol will render it useless or at best of minimum value in urethane systems. Furthermore any decrease in hydroxyl value will change the functionality of the molecule and will therefore drastically affect the physical properties of the subsequent foam. Temperatures that are too low, that is below about 60° C., cause the reaction time to be too long to incorporate the necessary amount of phosphorus. Accordingly, reaction temperatures of about 80° C. to 140° C., preferably 100° C. to 120° C., are utilized where no solvent is used in the system. Use of an inert high dielectric constant solvent increases the rate of reaction and allows for the use of a lower temperature or shorter reaction times.

During the reaction, air nitrogen can be used to strip off the organic halide, usually a lower alkyl halide which is formed during the reaction or else the reaction can be run under a partial vacuum to accomplish the same thing. The reaction mass is normally rapidly heated to about 105° C. to 120° C. and maintained there for about 2½ to 10 hours. After the reaction is essentially complete the reflux condenser is removed and replaced with a gas take-off adaptor. Vacuum can be applied for 15 minutes to two hours while maintaining the temperature at around 110° C. to 115° C. If more phosphite than is desired to react is used, the excess phosphite should be removed before it all reacts. The product can be passed through a falling film molecular still to remove any unreacted starting material.

It should be noted that the reaction between the phosphite and the halogen-containing polyoxyalkylene ether results in a phosphorus-carbon bond compound. In the reaction, phosphorus shifts from the trivalent state to the pentavalent state; the additional two valence bonds being occupied by an oxo-oxygen atom. Attention is directed to the fact that this product produces a carbon-phosphorus bond. This is very important. In many phosphorus containing polyol components, the phosphorus is bound through a C—O—P ester linkage (from C—OH alcohol, and P—OH acid). Since this is an ester linkage, it is subject to hydrolysis especially over time in humid conditions, and therefore the phosphorus can be separated and leached from the foam. This can destroy the foam structure as well as decreasing or eliminating the fire retardant properties. In the instant invention, the halogen and the phosphorus, which act synergistically in fire retardancy, are bound to the polyol. The carbon-phosphorus bond precludes any chance the phosphorus may be separated by water hydrolysis. Therefore the halogen and the phosphorus become an integral part of the urethane foam system and remains there over the life of the foam system. There is no decrease in flame retardancy over time due to leaching out or hydrolysis of the system.

When using a trialkyl phosphite, normally a lower alkyl phosphite is used so that the by-product, in this case an alkyl halide, will be volatile and, hence, easily distilled from the reaction mixture. Further, when making flame retardant polyols, the long chained phosphite should be avoided since two of the —OR groups of the phosphite stay attached to the phosphorus atom and long carbon chains add to the combustibility of the product. However, long chain phosphites, at least mixed phosphites such as diethyl octadecenyl phosphite are contemplated with the liberation of the lowest chained radical going off first as an alkyl halide.

Highly desirable phosphite reactants that can be used may be represented by the formula:

$$(RO)_3P$$

wherein R is a straight or branched chain alkyl, alkenyl, alkynyl, haloalkyl or aryl radical of 1–20 carbons, preferably 1–8 carbon atoms. Examples include trimethyl phosphite, triethyl phosphite, tripropyl phosphite, triisopropyl phosphite, tributyl phosphite, triisobutyl phosphite, triamyl phosphite, trihexyl phosphite, tri (2-ethylhexyl) phosphite, triheptyl phosphite, trioctyl phosphite, tri-(beta-chloroethyl) phosphite, etc. Mixed phosphites such as ethyldimethylphosphite, methyldiethylphosphite, ethyldibutylphosphite, propyldidodecylphosphite, diethyloctadecylphosphite, may be used. Also of importance are the unsaturated phosphites, such as triallyl phosphite inasmuch as these compounds provide multiple reactive sites for subsequent halogenation or polymerization. Other unsaturated phosphites include tricinnamyl phosphite, trimethallyl phosphite, trivinyl phosphite, tri-2-butenyl phosphite, tri-isopropenyl phosphite and tri-2-cyclohexylallyl phosphite.

The halogen-containing polyoxyalkylene ethers which are reacted with the triaromatic, trialiphatic or mixed phosphites to form the compounds of this invention fall into two groups, i.e., old and new compounds. In general, the halogen-containing polyoxyalkylene ethers are formed by the condensation of polyhydric alcohols with an haloepoxide. This condensation is well known and has been described in U.S. Pat. Nos. 2,581,464, 3,255,126 and 3,260,687 hereby incorporated by reference to the extent pertinent.

In the preparation of adducts of the present invention any monomeric polyhydric alcohol may be employed. The polyhydric alcohol contains at least two hydroxyl groups and may be aliphatic or aromatic, saturated or unsaturated. The preferred polyhydric alcohols are glycerol and pentaerythritol due to availability and ease of reaction. Others which may be employed include, but are not limited to, the following: ethylene glycol, propylene glycol, 1,4-butanediol, diethylene glycol, dipropylene glycol, neopentyl glycol, triethylene glycol, hexamethylene glycol, hexanetriol, butanetriol, trimethylol propane, trimethylol ethane, polyglycerol, dipentaerythritol, polypentaerythritol, erythritol, mannitol, sorbitol, 2-butene-1,4-diol, 2-butyne-1,4-diol, p,p'-isopropylidenediphenol, resorcinol, catechol, hydroquinone, alkyl glucosides such as methyl glucoside, 4,4'-dihydroxybenzophenone, mono-, di-, and polysaccharides, such as glucose, sucrose, lactose, and starch, etc. Also included are the saturated or unsaturated non-substituted or substituted with non-interfering groups mono- and di-fatty acid esters of the above-mentioned polyols. Normally the acyl chain of the fatty esters will contain about 8–22 carbons and may in turn also contain hydroxyl groups. Most desirable fatty acid esters include those esters of the higher functionality polyols such as mannitol, sorbitol, mono-, di- and polysaccharides.

Other polyols suitable for reaction with haloepoxides are the aliphatic ketone-polyalcohols or the aldehyde-polyalcohols of less than about 18 carbon atoms. Of particular importance are the monosaccharides ranging from the trioses up to and including the decoses (10 carbons). The pentoses and hexoses are the most important, however, trioses, tetroses, heptoses, octoses, etc., are of considerable value.

Glyceric aldehyde and dihydroxyacetone are representative members of trioses while threose and its epimer erythrose are representative members of the tetroses. Lyxose, xylose, arabinose and ribose are typical of the aldopentoses. Aldohexoses include talose, galactose, idose, gulose, mannose, glucose, altrose and allose. The ketoses corresponding to the above-mentioned aldoses are also included. Perhaps the best representative of the ketoses class is fructose. Also included within the list of the above sugars are all the optical isomers whether active or not such as racemic mixtures.

At this point it is mentioned that it is old in the art to react halogenated epoxides with certain types of polyhydric alcohols and other low molecular weight materials to produce polyoxyalkylene ethers and that they in turn are used in polyurethane foam systems. The phosphonated derivatives, however, are new compositions of matter and possess both unexpected and superior properties as will be shown later on.

Most of the low molecular weight materials possess a high cross-linking density not suitable for flexible urethane foams. This, along with other less desirable properties prompted the synthesis of a second class of high utility, novel, halogen-containing polyoxyalkylene ethers which appear to be far superior to the low molecular weight materials such as the reaction product of glycol and 5–10 moles of epibromohydrin. This novel class of halogen-containing polyoxyalkylene ethers are derived from hydroxy containing higher fatty acid esters of low molecular weight polyols and haloepoxides. The long chain fatty group is believed to impart plasticization to the flexible and semi-rigid foams and this desirable property is not apparent when the small chain derivatives are used. In addition, triglyceride esters of hydroxy fatty acids produced superior results believed due to the three functionality of the molecule.

Since the second class of halogen-containing polyoxyalkylene ethers are novel compositions of matter, a detailed description of their synthesis will be set forth at this time. Further, the invention will be represented in detail by this class of compounds but it should be realized that the amounts of epoxy halo compounds, catalysts, reaction times, phosphonation, preparation of the urethane foams, etc., also apply to the use of the first class, i.e., the old polyoxyalkylene ether derivatives of low molecular weight polyhydric alcohols.

In general, the halogen-containing polyoxyalkylene ethers that are subsequently phosphonated in accordance with the teachings of this invention are hydroxy and halogen-containing ether adducts derived from hydroxy higher fatty acid esters of low molecular weight polyols and haloepoxides.

The hydroxyl and halogen-containing ether adducts used in this invention are products obtained by reacting an aliphatic haloepoxide with a particular polyhydric alcohol and in this case with a "polyol ester" to produce polyethers containing chemically combined hydroxyl and halogen in the polyether unit of the molecule. The reaction is carried out at temperatures between about 30° C. and 150° C. in the presence of an acidic catalyst, usually of the Lewis acid type. Typical catalysts are $BF_3$, $SnCl_4$, $ZnCl_4$, $AlCl_3$, $TiCl_4$, etc., used in amounts of about .01% to about 3% based on the total weight of the reactants. The reaction time to prepare the adduct will vary depending upon the temperature of the reaction, the reactants employed, the amounts thereof, the use of a solvent, and the type of solvent. Generally, however, a reaction time in the range of between about 30 minutes and 100 hours is utilized.

The "polyol ester" reactant which is reacted with the haloepoxide can be saturated or unsaturated and is a higher fatty acid ester (that may also contain a hydroxyl group) of a polyhydric alcohol wherein the alcohol portion contains about 2 to 6 carbons and about 2 to 6 hydroxyl groups. The term "higher fatty acids" as used herein refers to fatty acids either saturated or unsaturated, straight or branched chain of about 8 to about 30 carbon atoms (10 to 22 carbon atoms preferred) which may contain one or more hydroxyl groups per acyl radical of the ester molecule. Castor oil is an example of a naturally occurring unsaturated "polyol ester" while the ethylene glycol ester of ricinoleic acid is an example of a synthetic unsaturated "polyol ester." Saturated "polyol ester" reactants are typified by the 9-hydroxy stearic acid ester of pentaerythritol.

Suitable low molecular weight polyhydric alcohols that comprise the "polyol ester" reactant are selected from the glycols, triols, tetraols, pentols and hexols and are represented by ethylene glycol, glycerol, pentaerythritol, sorbitol, etc. Since these low molecular weight polyhydric alcohols are multifunctional, it is possible that the hydroxyl function be present on only some or even on none of the acyl radicals making up the polyol ester reactant.

The aliphatic haloepoxides that can be reacted with the "polyol ester" reactant to form the hydroxy and halogen-containing ether derivatives of the hydroxy fatty acid esters are those saturated or unsaturated aliphatic $C_3$-$C_{10}$ straight or branched chain haloepoxides. The halogen constituent on the epoxide is preferably a chlorine or bromine atom but iodine and fluorine are contemplated. Examples of preferred reactants are epichlorohydrin and epibromohydrin. Representative aliphatic haloepoxides include:

3-chloro-1,2-epoxybutane;
3-bromo-1,2-epoxybutane;
1-chloro-2,3-epoxybutane,
1-bromo-2,3-epoxybutane;
1-chloro-3,4-epoxy-1-butene;
1-bromo-3,4-epoxy-1-butene;
3,4-dichloro-1,2-epoxybutane;
3,4-dibromo-1,2-epoxybutane;
1,4-dichloro-2,3-epoxybutane;
1,4-dibromo-2,3-epoxybutane;
chloroisobutylene oxide;
bromoisobutylene oxide;
1-chloro-2,3-epoxypentane;
1-bromo-2,3-epoxypentane;
4-chloro-2,3-epoxypentane;
4-bromo-2,3-epoxypentane;
3-chloro-1,2-epoxypentane;
3-bromo-1,2-epoxypentane;
1,4-dichloro-2,3-epoxypentane;
1,4-dibromo-2,3-epoxypentane;
1-chloro-2,3-epoxyhexane;
1-bromo-2,3-epoxyhexane;
1,4-dichloro-2,3-epoxyhexane;
1,4-dibromo-2,3-epoxyhexane;
2-chloro-3,4-epoxyhexane;
2-bromo-3,4-epoxyhexane;
2,5-dichloro-3,4-epoxyhexane;
2,5-dibromo-3,4-epoxyhexane;
4-chloro-2,3-epoxyhexane;
4-bromo-2,3-epoxyhexane.

As is well known to those skilled in the art, the polyols are the major building blocks of the urethane foams and are generally the ingredient upon which the behavior and properties of the foam depend. The chemical characteristics of the polyols necessary to achieve a foam with the right physical characteristics have been defined quite carefully. An ideal polyol for producing flexible urethane foam has a hydroxyl value of approximately 56 and a molecular weight of approximately 3,000. With these values in mind, it is possible by using the instant invention to design a compound having the desirable characteristics and yet contain a large amount of flame-retardant elements. For example, epibromohydrin can be reacted with castor oil in the presence of $BF_3$ as a catalyst. This product basically is a triglyceride which has had its glyceride chains lengthened first by reacting epoxide groups with hydroxyls of the ricinoleic acyl radical, then by subsequent polymerization of epibromohydrin onto the new hydroxyl groups. The molecular weight can be controlled simply by the amount of epibromohydrin added to the product. This material when subsequently phosphonated produces an outstanding flame-retardant polyol for the urethane foams. Further, the amount of phosphorus incorporated into the molecule can be varied depending upon the amount of trialkylphosphite used. Therefore one can nearly "tailor make" the molecule with whatever halogen-phosphorus ratio desired.

Even finer control of the amount of halogen incorporated into the molecule can be had by reacting the adduct of epihalohydrin and a polyol containing an unsaturated group with molecular halogen. If it is desired to increase the halogen content with a minimum increase in molecular weight of the product, this is a good way. Each addition of a epihalohydrin increases not only the halogen content but also the carbon, hydrogen and oxygen content of the molecule. Halogenation after the epihalohydrin has reacted will increase the halogen content directly. This also allows for halogenation of materials that are inherently unstable if halogenated directly before reaction with the epihalohydrin as is the case with castor oil. The subsequent phosphonation reaction goes smoothly and the product is a light colored oil that is stable, high in halogen, contains carbon bound phosphorus with all the advantages that entails and makes good urethane foam products when reacted with an isocyanate. In this case also great variation of halogen-phosphorus ratios are possible by varying the amount of trialkyl phosphite used in the system.

Although polymerization is mainly in the direction shown

some goes in the opposite way such as

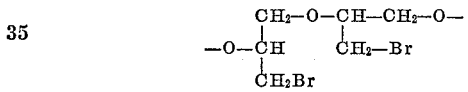

The following general formula can be used to illustrate one embodiment of the invention and when this formula is used, both in the specification and claims, it is intended to cover both forms of polymerizaiton:

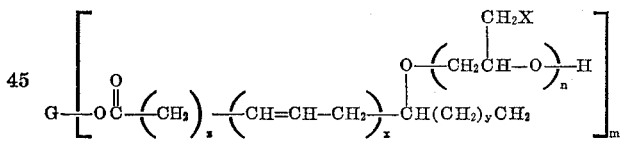

wherein G is a monovalent to hexavalent alkyl group and usually hydrocarbon, or hydroxy substituted hydrocarbon, $z$ is an integer of 0 to 7, $x$ is an integer of 0 to 3, $y$ is an integer of 0 to 7, $n$ is an integer of 1 to 50, $m$ is an integer of 1 to 6, and X is halogen and usually —Cl, —Br or —I.

After the compound is reacted with the phosphite some or all of the X's, depending upon amounts and conditions, will be —PO(OR)$_2$ wherein R is defined above in the discussion of the phosphite reactant.

The following examples are set forth as illustrated embodiments of the invention and are not to be taken in any manner as limiting the scope of the invention.

EXAMPLE I

An appropriate size round bottom flask equipped with a motor driven stirrer, a thermometer, a reflux condenser, and a dropping funnel was charged with 100 grams castor oil and 300 grams of epibromohydrin. Stirring was started and the mixture heated to about 70° C. before 4 grams of $BF_3$ etherate in 30 grams of benzene was slowly added through the dropping funnel. The reaction took place exothermically and the temperature was controlled both by cooling the reaction flask with an external ice bath as well as controlling the rate of catalyst addition. The reaction temperature was controlled between about 80° C. to 90° C. After all the catalyst was added the reaction was allowed to cool to about 65° C. where the temperature was maintained for 4½ hours. At this point about 400 cc. water was added and the mixture rapidly agitated. The mixture was allowed to settle and the upper water layer removed. The product was rewashed two more times with 400 cc. water. After the final washing, the water layer was removed and the product passed through a falling film molecular still to remove all water from it. The resulting product was a very dark amber brown oil that analyzed for over 40% bromine, had a hydroxyl value of over 70 and an acid value under about 3.

Approximately 200 grams of this product of epibromohydrin and castor oil was weighed into a round bottom flask equipped with a temperature controller, a reflux condenser that had a gas outlet adaptor at the top, and a vacuum tight method of stirring. Into this flask, 44 grams of triethyl phosphite was weighed and the reaction mixture was heated to 115–120° C. A vacuum of about 15 inches gage pressure was applied and the temperature controller maintained the temperature at 115–120° C. for 3½ hours. At this point the reflux condenser was removed and the gas outlet adaptor put in its place. A vacuum of about 29.5 inches gage pressure was applied for about one-half hour while the temperature was maintained as before. The product was then passed through a falling film molecular still to remove any unreacted or volatile components. The product was a light amber viscous oil that analyzed 34% bromine, 3% phosphorus and had a hydroxyl value of about 56 and an acid value of about 0.1.

The first step of the reaction can be varied by charging the $BF_3$ etherate catalyst with the castor oil and slowly metering in the epibromohydrin at a rate such as to maintain the temperature at about 80° C. After all the epibromohydrin has been added the temperature is maintained at 65° C. for about 3 hours. The analysis of the product done by this procedure is very similar to that made above. The second step reaction product is also very similar in its analysis.

EXAMPLE II

Into a 500 ml., 3-neck round bottom flask equipped as in Example I, was weighed 200 grams of the epibromohydrin-castor oil adduct made by either procedure in Example I, and 110 grams tri (2-ethylhexyl) phosphite. The reaction mixture was heated to 120° C. (the two components are not soluble in each other until a temperature of 120° C.) and maintained at a range of 118–122° C. for the course of the reaction. A vacuum of 27 inches gage pressure was applied for 3½ hours. At this time a vacuum pressure of 0.5 mm. Hg was applied for an additional one-half hour. The product was washed with water and distilled in a falling film molecular still. The resulting straw color product analyzed at 29.5% bromine, 2.47% phosphorus, 54.9 hydroxyl value, and an acid number of about 0.1.

EXAMPLE III

Into a round bottom flask was weighed 190 grams castor oil and 80 grams epibromohydrin. The reaction mixture was preheated to about 70° C. before slowly adding 0.6 gram $BF_3$ etherate in 3 cc. benzene. The exothermic reaction was controlled at 85–90° C. by external cooling with an ice bath and by varying the rate of catalyst addition. After all the catalyst had been added, the temperature was controlled at about 65° C. for three hours. At this point, 70 cc. water and 80 cc. hexane were added and the reaction mixture cooled to 5° C. by an external ice bath. While maintaining the temperature between 5–10° C., 68 grams of bromine was slowly added. When all the bromine was added, the reaction mixture was stirred an additional hour at room temperature and then distilled through a falling film molecular still at 140° C. with a pressure of 0.1 mm. Hg. The resulting dark amber-brown oil analyzed 32.6% bromine with a hydroxyl value of 98 and an acid value of 1.2.

This product was then phosphonated by weighing 200 grams into a 3-neck round bottom flask equipped with thermometer and temperature controller, motor driven stirrer and a reflux condenser fitted with a gas outlet on the top. Triethylphosphite (44 grams) was then added and the reaction mixture heated at 85° C. for the course of the reaction. A vacuum of 15 inches gage pressure was applied for 4½ hours, followed by a vacuum of 29 inches gage pressure for an additional ½ hour. The product was then distilled through a falling film molecular still at 140° C. and 0.1 mm. Hg. The resulting straw colored product analyzed 28% bromine, 2.09% phosphorus, hydroxyl value of 63.5 and an acid value of 0.4.

EXAMPLE IV

Approximately 1200 grams of ricinoleic acid and 136 grams of pentaerythritol were esterified by typical procedures heating to reflux in a benzene solution for about 4 hours after ading about 5 grams of concentrated hydrochloric acid catalyst. The solvent was removed and the ester washed with dilute base to remove any excess acid. Then several times with water. The ester was then dried and the solvent removed.

The pentaerythritol ricinoleate ester (1000 grams) and 2000 grams of epibromohydrin were charged into a round bottom 3-neck flask equipped with motor driven stirrer, thermometer, dropping funnel, and reflux condenser. After preheating the mixture to about 70° C., the catalyst (7 grams stannic chloride in 30 grams benzene) was slowly added. The exothermic reaction was controlled at about 85–90° C. by varying the rate of catalyst addition and cooling externally with an ice bath. After all the catalyst was added the reaction mixture was maintained at 65° C. for about 4 hours and then it was washed three times with approximately 3000 cc. water each. The product was then passed through a thin film molecular still at 150° C. and 0.1 mm. Hg vacuum pressure.

A portion of 200 grams of the sorbitan monooleate weighed into a round bottom, 3-neck flask equipped with stirrer, condenser with gas outlet on the top, and a thermometer with a temperature controller, and 110 grams triethyl phosphite were added. The reaction mixture was heated to 115–120° C. and maintained throughout the reaction. A vacuum pressure of about 15 inches gage pressure was applied for about 3½ hours and increased to 29 inches for an additional one-half hour. The final product, a dark straw colored viscous oil, was passed through a thin film molecular still at 140° C. and 0.1 mm. Hg pressure for final purification.

EXAMPLE V

Into a 3-neck round bottom flask was weighed 46.3 grams of sorbitan monooleate and 274 grams of epibromohydrin. The mixture was heated to 70° C. and 1.5 grams $BF_3$ etherate in 5 grams benzene slowly added through a dropping funnel. The reaction was exothermic but mildly so such that the temperature could be controlled at 90–95° C. without external cooling simply by varying the rate of catalyst addition. After all the catalyst has been added the temperature was maintained at 85° C. for about 5 hours before adding another 1.5 grams $BF_3$ etherate in 5 grams benzene. After the second addition of catalyst, the temperature was again maintained at 85° C. for one additional hour before the product was washed three times with about 300 cc. water each. The product was passed through a falling film molecular still to give a viscous very dark oil which analyzed 44.6% bromine and had a hydroxyl number of 83.3 and an acid value of 4.7.

A portion of 200 grams of the sorbitan monooleate-epibromohydrin adduct was weighed into a 3-neck round bottom flask equipped as previously described and 40 grams of triethyl phosphite was added. The mixture was heated to 115–120° C. and this temperature was maintained throughout the reaction. A partial vacuum of about 15 inches gage pressure was applied and maintained for 3½ hours followed by one-half hour at a partial vacuum of about 29 inches. The product was then passed through a falling film molecular still at 150° C. and 0.1 mm. Hg pressure to remove any unreacted phosphite and any volatile impurities. The final product was a straw colored viscous oil that analyzed 36% bromine, 2.95% phosphorus, and had a hydroxyl number of 58.1 and an acid number of 0.3.

By the same procedures the epibromohydrin adducts and then the corresponding phosphonate derivatives were made from sorbitan monotallate, sorbitan monolaurate and sorbitan monostearate.

EXAMPLE VI

By the procedure described in Example V, 123 grams of epibromohydrin and 44.5 grams of sorbitan monooleate were reacted together using 1.5 grams of $BF_3$ etherate in 5 grams benzene as catalyst. After the temperature was maintained at about 85° for about 3 hours after all the catalyst was added, about 70 cc. of water and 80 cc. of hexane were added. The reaction mixture was cooled to about 5° C. by means of an external ice bath before 72 grams of bromine was slowly added. The temperature was maintained at 5–10° C. during bromination. After all the bromine was added the reaction mixture was allowed to stir at room temperature for about one hour. After preliminary removal of solvent and water on a rotary evaporator the product was passed through a thin film molecular still at 150° C. and 0.5 mm. Hg pressure to give a very dark viscous oil that analyzed 43% bromine and had a hydroxyl value of 91 and an acid value of 2.4.

About 100 grams of the product was weighed into a 3-neck round bottom flask equipped as previously described and 20 grams of triethyl phosphite was added. The reaction was run at 115–120° C. for 3½ hours under a reduced pressure of 15 inches and for one-half hour under a reduced pressure of 29 inches. The product was then passed through a falling film molecular still at 140° C. and 0.5 mm. Hg pressure to give a straw colored viscous oil that analyzed 36% bromine, 2.8% phosphorus and had a hydroxyl value of 60 and an acid value of 0.2.

By the same procedure sorbitan monotallate was reacted with epibromohydrin and subsequently brominated. It gave a product with essentially the same analysis except that it contained 44.5% bromine. The phosphonation was done the same way also and the analysis showed 37% bromine, 2.64% phosphorous and a hydroxyl value of 59.7.

EXAMPLE VII

A commercial sample of glycerol monooleate (Atlas Chem. Co., Atmos 300) containing about 60% monoglyceride and 40% diglyceride (48.6 grams) was weighed into a 3-neck round bottom flask along with 153.4 grams of epibromohydrin. The $BF_3$ etherate catalyst (2 grams in 10 grams benzene) was added in the usual way controlling the temperature between 90–95° C. with external cooling. When all the catalyst was added, the mixture was stirred for 5 hours at 65° C. before it was washed 3 times with 200 cc. portions of water. The product was passed through the thin film molecular still to yield a viscous very dark oil that analyzed 42.5% bromine and had a hydroxyl value of 120.2 and an acid value of 6.6.

A portion of this product (100 grams) was weighed into a flask and 22 grams of triethyl phosphite were added. The phosphonation reaction was run as previously described maintaining the temperature at 115–120° C. The pressure was reduced to about 15 inches for 4½ hours followed by 45 minutes when the pressure was reduced to about 29 inches. The phosphonated product was then passed through a thin film molecular still at a temperature of 150° C. and a pressure of 0.5 mm. Hg. The resulting light straw colored viscous oil analyzed 34.6% bromine, 3.04% phosphorus, and had a hydroxyl value of 46.1 and an acid value of 8.0.

EXAMPLE VIII

A glycerol-epichlorohydrin adduct was prepared using the procedure described in U.S. 3,255,126 and 300 grams of the product was weighed into a 500 cc., 3-neck round bottom flask followed by 48 grams of trimethyl phosphite. The reaction mixture was heated to 90–95° C. for three hours under a reduced pressure of about 15 inches then while maintaining the heat the pressure was further reduced to about 29 inches for an additional one-half hour. The phosphonated product was then passed through a thin film molecular still at 150° C. and 0.5 mm. Hg pressure to remove any unreacted trimethyl phosphite or any volatile byproducts.

EXAMPLE IX

The pentaerythritol-epichlorohydrin adduct described in U.S. 3,255,126 was prepared by the procedure described therein and 300 grams of this product was weighed into a 500 ml. 3-neck round bottom flask equipped as previously described along with 96 grams of tri(2-ethylhexyl) phosphite. The reaction mixture was heated to 120–125° C. and the pressure reduced to about 20 inches for a period of 4½ hours. At this time the pressure was further reduced to about 15 mm. Hg while the temperature was maintained for an additional hour. The phosphonated product was then passed through a falling film molecular still at 150° C. and 0.5 mm. Hg. to remove any unreacted tri(2-ethylhexyl) phosphite as well as any volatile impurities.

The products of this invention combine the advantages of the previously mentioned flame retardants. The novel compositions of matter do not leach out or evaporate like the nonreactant polyols, nor do they impart physical changes like other reactive flame retardants. They give a very high degree of flame retardancy to the flexible foam. A still further advantage is that the compounds of this invention have multiple functionality and that the compounds are quite versatile in forming new compounds of desired characteristics.

It should be noted that the unsaturation of the triglyceride provides a means for controlling the halogen content of the molecule. These products can be treated with short chain aliphatic oxides, such as ethylene, propylene or butylene oxide to increase the molecular weight by methods that are well known to one skilled in the art. It should also be noted that treatment of the polyol adduct with an alkylene oxide converts the secondary alcohol function to a primary alcohol function which is much more reactive.

When it is desirable to halogenate the hydroxy and halogen containing ether derivatives of the higher fatty esters of this invention, the unsaturated portion of the triglyceride can be most effectively halogenated by contacting the unsaturated polyol adduct with free halogen (usually chlorine or bromine). A suitable solvent can be used and preferably should be used, to moderate the reaction.

The addition of the halogen should be conducted at a sufficiently low temperature to avoid decomposition of the product. Thus, during addition of the halogen, reaction mixture temperature should be kept below about 30° C. In many cases, it may be found best to maintain the reaction at low temperatures, i.e., in the range of about —10° C. to about 20° C. during the addition of the halogen and then warm the mixture to a higher temperature to assure complete reaction. Particular suitable solvents for the halogenation reaction include petroleum ether, hexane, benzene, toluene, xylene, or two phase systems using solvent and water or water-alcohol mixtures.

The unsaturated portion of the glyceride adducts can be halogenated so that about 99–50% of the unsaturation remains. Accordingly, it can be seen that one can add bromine and cut back on the amount of epibromohydrin used to form the adduct.

For example, by proper manipulation of the quantity of epibromohydrin and bromine used, it is possible to make compounds (polyols) that have high bromine and high hydroxyl content. This also allows for a much finer adjustment of bromine and hydroxyl to nearly any desired ratio. When the "polyol ester" is reacted with epibromohydrin, three carbon atoms, five hydrogen atoms and one oxygen atom are added to the molecule for each bromine atom. Furthermore, the molecular weight is increased by an amount of those carbon, hydrogen and oxygen atoms to decrease the hydroxyl value of the product. By brominating the double bonds, the bromine content can go up immediately and nothing else contributes to the molecular weight change.

By way of example, it should be noted that brominated castor oil has a hydroxyl value of about 100 and a bromine content of about 31%. Brominated castor oil by itself however has very little utility in urethane foam systems because of its instability. It darkens and builds up acid on storage, especially at higher temperatures. By proper adjustment of the amount of epibromohydrin and bromine used, one can make, as taught by this invention in Example III, a product that has the same hydroxyl and bromine content as brominated castor oil, but is not unstable, has a low acid value, high viscosity and good color. Further, the product retains these desirable features over long periods of time.

As discussed above, an outstanding use for the novel polyol adducts of this invention is in providing flame resistance for isocyanate or polyurethane foams. The term "flame-resistant" is used to characterize a material which does not burn readily. The polyol adducts may be used individually or in various mixtures and combinations with other hydroxy containing reactants. Due to the fact that these compositions possess multiple hydroxy groups, the compounds actually react with the isocyanates in the formation of urethane foams to produce flame resistant copolymers. In this respect, they may replace some or all of the polyols generally used in such formulations.

The production of polyurethane foams is well known, and a detailed description of such processes is not warranted here. Briefly, however, the process involves the reaction of an isocyanate and another polyfunctional compound which contains an active hydrogen, i.e., hydroxyl, carboxyl, amino groups, etc.

Actual utility of the flame-resistant foams is typified by the technique of foam-in-place insulation. Such insulation has been used in automobiles, refrigerators and aircraft where the foams add strength as well as fire resistance to the various components. The degree of crosslinking and the type of polyols used determines whether the final product is rigid or flexible. Since the polyols of this invention may replace all or only a part of the normally used polyols, they are thus adaptable for use in either flexible or semi-rigid foams.

The invention contemplates either a pre-polymer process or a one-shot process for making polyurethane foams. In the pre-polymer process, the polyol adducts with or without another polyhydric polyalkylene ether is heated under substantially anhydrous conditions with an excess of organic polyisocyanate to form an isocyano terminated adduct. This adduct is then reacted with additional polyol or amino compound and water in a second step to produce a foam. In a one-sort process, the organic polyisocyanate, the polyol adduct and other ingredients of the foamable mixture are all mixed together substantially simultaneously. If a blowing agent is used, water is not necessary and in fact should be avoided.

In its broadest aspects, the invention contemplates the preparation of polyurethane foams using the phosphonated polyols of this invention as the sole polyol component of the polyurethane foam. Also, the phosphonated polyols can be a constituent of a polyol mixture of two or more polyols used to prepare a polyurethane foam. Other polyols that can be used in this fashion to prepare fire retardant polyurethane foams are polyoxypropylene glycols, polyoxytetramethylene glycols, and polyoxybutylene glycols. These polyols are preferred to be polymerized adducts of propylene oxide, ethylene oxide, 1,2- or 2,3-butylene oxide or the like with ethylene glycol, trimethylolpropane, pentaerythritol, 1,2,6-hexanetriol, 1,4-butanediol, sorbitol, mannitol, propylene glycol, sucrose, diethylene glycol, glycerine or the like.

Other alcohols that are not of a polymeric nature that might be employed as constituents of a polyol mixture that includes the phosphonated polyols of this invention are the following: diethanolamine, triethanolamine, triisopropanolamine, diisopropanolamine, pentaerythritol, trimethylolpropane, glycerine or the like. It is preferred that these low molecular weight alcohols be at least difunctional and preferably tri- or tetrafunctional and they can comprise from 5% to 75% by weight of the total polyol mixture. It is understood that the amount of polyoxyalkylene glycol or monomer alcohol used in a polyol mixture, along with the phosphonated polyols of this invention will depend upon the physical properties and degree of flame retardancy desired in the polyurethane foam.

Any desirable organic di- or polyisocyanate can be used as the isocyanate component for the preparation of polyurethane foams. Organic polyisocyanates that can be used are 2,4-toluene diisocyanate, 2,6-toluene diisocyanate, and mixtures of the two ingredients, xylene-1,3-diisocyanate, xylene-1,4-diisocyanate, dodecamethylene diisocyanate, undecamethylene diisocyanate, pentamethylene diisocyanate, ethylene diisocyanate, diphenylmethane diisocyanate, m-phenylene diisocyanate, cyclohexylene-1,4-diisocyanate, polymethylene polyphenylisocyanate, p-isocyanobenzyl isocyanate, bis(2-isocyanatoethyl) fumarate or the like.

Polyurethane foams can be manufactured in accordance with this invention by any suitable manipulative step or technique. Halogen-alkanes or other gases can be included in the foam formulation to effect the blowing of the foam. Dichlorodifluoroethane, trichlorofluoromethane, trichlorotrifluoroethane and other halogen-alkanes, as well as inert gases like nitrogen or the like can be used alone or with water to form the porous foam structure. Water can be used alone in the reaction mixture to react with the polyisocyanate to form carbon dioxide which becomes entrapped in the reaction mixture to form the porous product. Any suitable amount of water, such as 0.1 to 7 parts water per 100 parts of phosphonated product, can be used.

Any suitable activator in an amount of about 0.01% to 2%, by weight basis adduct, such as stannous oleate, stannous octoate, triethylene diamine, dibutyltin dilaurate, tetramethyl 1,3-butanediamine, N-ethylmorpholine, piperazine, or the like can be used. Emulsifiers and surfactants such as silicone oils and soaps can be used to improve the cell structure of the foam.

The compositions of this invention are particularly advantageous for the preparation of flame-resistant polyurethane foams since they are stable polyols at ambient temperatures and produce polyurethane foams that are uniform, contain no blow holes or cracks, show little or no tendency toward brittleness, do not shrink excessively on aging, have low density, and possess very good flame resistant properties. They also produce foams that have the flame retardant elements of halogen and phosphorus in a stable form that will not migrate or leach out of the foam. Since the phosphorus is bound to carbon atom covalently it is not subject to hydrolysis and therefore will not lose its effectiveness over time. The polyol adducts prepared in accordance with this invention have low acid numbers and consequently do not necessitate the inclusion of amino alcohols or amines in the polyol mixture. The polyurethane foam which is made in accordance with this invention can be used for making chair and seat cushions and for insulation materials for buildings, home refrigerators, refrigerated trucks, and refrigerated railroad cars.

Additional examples are as follows:

EXAMPLE X

The adduct of epichlorohydrin and dextrose dissolved in ethylene glycol was prepared by the method disclosed in U.S. 2,581,464 and 200 grams of this polyol was heated in a 3-neck round bottom flask to 120–125° C. with 40 grams of triethylphosphite for a period of 4½ hours while the pressure was reduced to about 15 inches. The pressure was further reduced to about 15 mm. Hg for an additional 45 minutes while the temperature was maintained. The resulting phosphonated product was passed through a falling film molecular still at 150° C. and 0.5 mm. Hg to remove unreacted triethylphosphite and any volatile by-products.

EXAMPLE XI

Example of one shot system using phosphonated polyol of this invention as the only polyol Approximately 144 grams of the phosphonated product produced by Example I was mixed with 2.5 parts of silicone surfactant (Union Carbide L-520), 0.5 part of a 33% solution of triethylene diamine, 1.4 parts of N-ethyl morpholine, 0.26 part of stannous octoate, and 4.0 parts of water. These chemicals were blended quickly and as completely as possible. 52.2 grams of toluene diisocyanate was subsequently added with vigorous mixing. In about 15 seconds frothing began and the blend was poured into a mold and allowed to cure. Various rates of cure were effected by catalyst adjustment.

EXAMPLE XII

Example of one shot system using phosphonated polyol of this invention as a supplemental polyol Forty grams of a polyalkylene polyether, MW 3000 (Union Carbide Polyol LF-56) was blended with 14 grams of phosphonated polyol produced by Example I, 1.5 grams L-520, a silicone surfactant, 0.2 part N-ethyl morpholine, 0.25 gram of a 33% solution of triethylene diamine, 0.13 part of stannous octoate, and 2.0 parts of water. After a few seconds of vigorous blending 26.1 grams of toluene diisocyanate was added with additional blending. In about 15 seconds frothing began and the blend was poured into a mold and allowed to cure. Rates of cure were dependent on catalyst concentration.

Obviously many modifications and variations of the invention as hereinbefore set forth may be made without departing from the spirit and scope thereof and therefore, only those limitations should be imposed as are indicated in the appended claims.

I claim:

1. Prepolymer material having isocyanate groups capable of further reaction with hydroxy groups comprising the condensation product of a polyisocyanate and the reaction product produced by reacting an organic phosphite having the formula $(RO)_3P$ wherein R is a straight or branched chain alkyl, alkenyl, alkynyl, haloalkyl or aryl radical of 1–20 carbons with a halogen-containing polyoxyalkylene ether of a polyol ester at a temperature not substantially in excess of about 150° C. wherein the reaction product contains halogen, has a hydroxyl number of between about 25 and 300 and a molecular weight of between about 1000 and 6000.

2. The composition of claim 1 wherein the polyol ester is a halogen-containing polyoxyalkylene substituted castor oil.

3. The composition of claim 1 wherein the polyol ester is a halogen-containing polyoxyalkylene substituted sorbitan ester of a higher fatty acid.

4. The composition of claim 1 wherein the phosphite is a trialkyl phosphite having 8 or less carbon atoms per each alkyl group.

5. The composition of claim 1 wherein the polyol ester is epibromohydrinated castor oil or epichlorohydrinated castor oil.

6. The composition of claim 1 wherein the polyol ester is halogenated or alkoxylated prior to reaction with the phosphite.

7. A polyurethane prepared by the process which comprises reacting (1) the reaction product produced by reacting an organic phosphite having the formula $(RO)_3P$ wherein R is a straight or branched chain alkyl, alkenyl, alkynyl, haloalkyl or aryl radical of 1–20 carbons with a halogen-containing polyoxyalkylene ether polyol at a temperature not substantially in excess of about 150° C. wherein the reaction product contains halogen with (2) an organic polyisocyanate, in the presence of a reaction catalyst and (3) optionally a foam forming amount of a blowing agent.

8. The polyurethane of claim 7 wherein one or more polyols are present in addition to the reaction product of the phosphite and the halogen-containing polyoxyalkylene ether polyol.

9. The polyurethane of claim 7 wherein the urethane is in the form of a foam and the halogen-containing polyoxyalkylene ether polyol is an adduct of epibromohydrin or epichlorohydrin and a higher fatty acid ester polyol.

10. The foam of claim 9 wherein the halogen-containing polyoxyalkylene ether polyol is epibromohydrinated castor oil or epichlorohydrinated castor oil.

11. The foam of claim 9 wherein the organic phosphite is a trialkyl phosphite having 8 or less carbon atoms per each alkyl group.

12. The foam of claim 9 wherein the phosphite is a trialkyl phosphite having 8 or less carbon atoms per each alkyl group and the polyoxyalkylene ether polyol is the reaction product of castor oil and about 3 to about 150 moles of epibromohydrin.

13. A polyurethane of claim 7 wherein the urethane is in the form of a foam and the halogen-containing polyoxyalkylene ether polyol is an epibromohydrinated or epichlorohydrinated sorbitan ester of a higher fatty acid.

14. The foam of claim 13 wherein the sorbitan ester is selected from the group consisting of sorbitan monooleate, sorbitan monotallate, sorbitan monolaurate and sorbitan monostearate.

15. The foam of claim 13 wherein the sorbitan ester is halogenated or alkoxylated.

16. The polyurethane of claim 8 wherein the polyurethane is in the form of a foam and the additional polyol is a polyester polyol.

17. The foam of claim 16 wherein the halogen-containing polyoxyalkylene ether polyol is epibromohydrinated castor oil and the organic phosphite is triethyl phosphite or trimethyl phosphite.

18. The foam of claim 16 wherein the halogen-containing polyoxyalkylene ether polyol is epibromohydrinated sorbitan monooleate or epibromohydrinated sorbitan monotallate.

References Cited

UNITED STATES PATENTS

| | | | |
|---|---|---|---|
| 3,636,061 | 1/1972 | Turley | 260—2.5 AR |
| 3,609,107 | 9/1971 | Boyer | 260—2.5 AR |
| 3,458,457 | 7/1969 | Jacques | 260—2.5 AR |
| 3,682,988 | 8/1972 | Lewis | 260—2.5 AR |

DONALD E. CZAJA, Primary Examiner

C. W. IVY, Assistant Examiner

U.S. Cl. X.R.

260—2.5 AV, 18 TN, 75 NN, 77.5 AR